US 6,438,492 B1

(12) United States Patent
Le Tallec et al.

(10) Patent No.: US 6,438,492 B1
(45) Date of Patent: Aug. 20, 2002

(54) DEVICE FOR IMPROVING THE SECURITY OF AIRCRAFT IN VISUAL FLIGHT REGIME

(75) Inventors: Claude Le Tallec, Chatillon; Boris Gravier, Paris, both of (FR)

(73) Assignee: ONERA, Chatillon (FR)

( * ) Notice: Subject to any disclaimer, the term of this patent is extended or adjusted under 35 U.S.C. 154(b) by 0 days.

(21) Appl. No.: 09/743,100

(22) PCT Filed: Jul. 2, 1999

(86) PCT No.: PCT/FR99/01594

§ 371 (c)(1),
(2), (4) Date: Jan. 8, 2001

(87) PCT Pub. No.: WO00/02176

PCT Pub. Date: Jan. 13, 2000

(30) Foreign Application Priority Data

Jul. 6, 1998 (FR) .............................. 98 08606

(51) Int. Cl.⁷ .......................... G08G 5/04; G01C 21/00
(52) U.S. Cl. .......................... 701/301; 342/29; 340/961
(58) Field of Search ............... 701/300, 301; 342/29, 30, 36, 455; 340/961, 963, 964

(56) References Cited

U.S. PATENT DOCUMENTS

| 4,835,537 A | | 5/1989 | Manion ................. 340/961 |
| 5,153,836 A | * | 10/1992 | Fraughton et al. ........ 340/961 |
| 5,636,123 A | | 6/1997 | Rich et al. ............... 342/29 |
| 5,872,526 A | * | 2/1999 | Tognazzini ............. 701/301 |
| 6,064,335 A | * | 5/2000 | Eschenbach ............. 342/29 |
| 6,201,482 B1 | * | 3/2001 | Schiefele et al. ........ 701/301 |

FOREIGN PATENT DOCUMENTS

| FR | 2 314 549 | 1/1977 |
| FR | 2 706 660 | 12/1994 |
| FR | 2 716 028 | 8/1995 |
| GB | 1 548 424 | 7/1979 |
| WO | WO 9605562 | 2/1996 |

OTHER PUBLICATIONS

<<Cooperative Collison Avoidance System>>, IBM Technical Disclosure Bulletin, Feb. 1, 1995, vol. 38, No. 2, pp. 1–2 (whole document).

* cited by examiner

Primary Examiner—Gary Chin
(74) Attorney, Agent, or Firm—Larson & Taylor, PLC

(57) ABSTRACT

Measurements of the instantaneous position and speed of an aircraft are incorporated in co-operation messages regularly broadcast to other aircraft by radio. The device fitted on the aircraft, flying under visual flight rules, analyzes the data contained in the co-operation messages received from other aircraft and its own trajectory in order to identify potential risk of collision. The pilot is alerted to these potential risks of collision, advantageously in voice form, in messages identifying the direction in which the other aircraft is visible as well as an estimation of the time remaining until the potential collision.

17 Claims, 4 Drawing Sheets

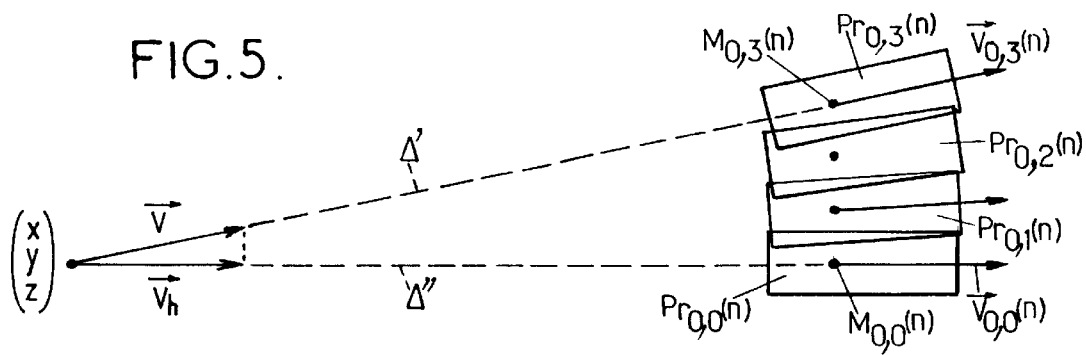
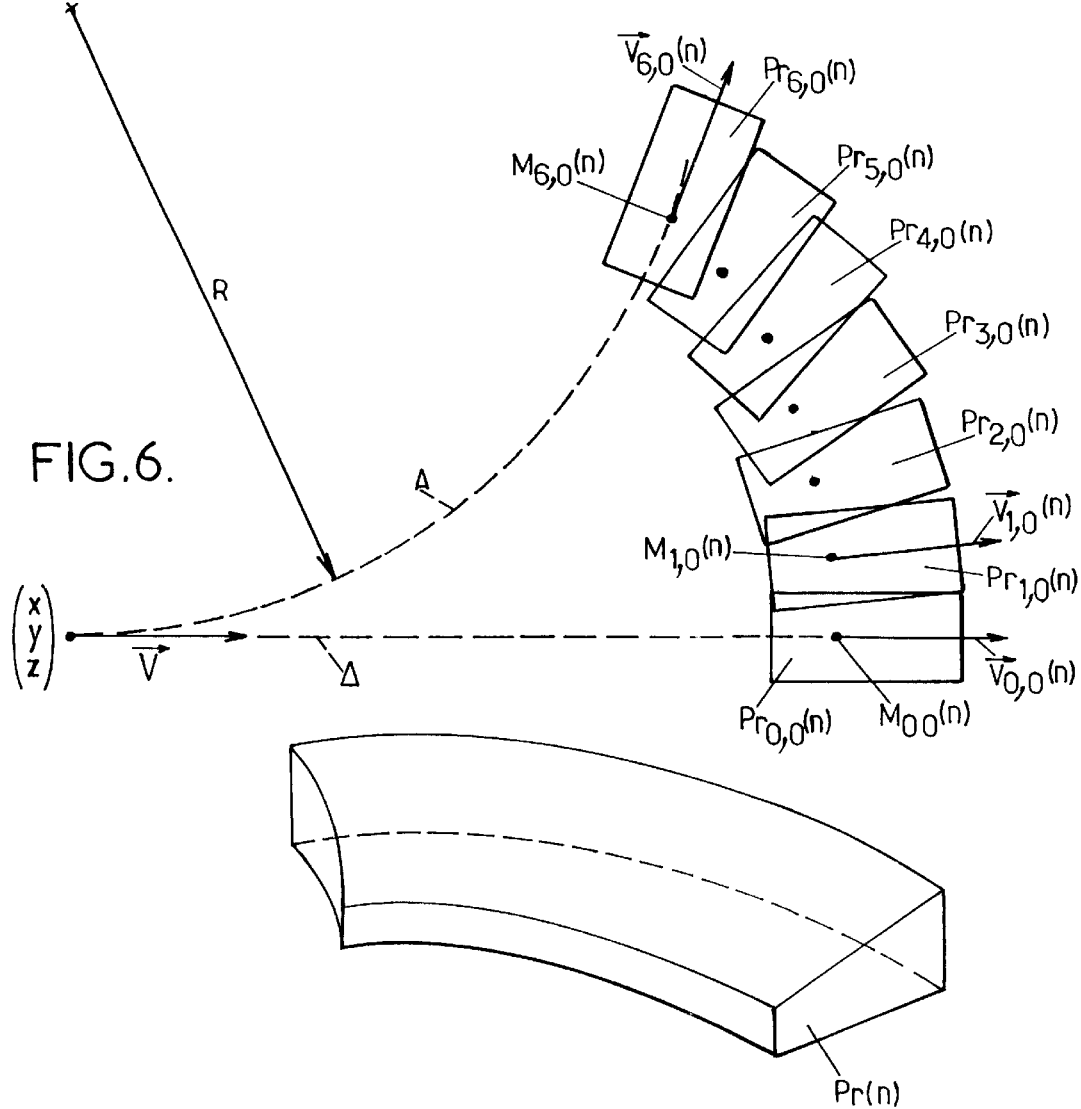
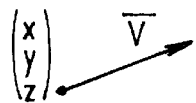

DEVICE FOR IMPROVING THE SECURITY OF AIRCRAFT IN VISUAL FLIGHT REGIME

BACKGROUND OF THE INVENTION

The present invention relates to a device for preventing collision risks between aircraft operating under VFR (Visual Flight Rules).

The invention is adapted to the piloting rules used by VFR pilots, the basic principle of which is: see and be seen. In effect, the reason most commonly found in reporting of accidents involving collision is the inability of the pilot to see the other aircraft in time. It is therefore desirable to improve the safety of all aircraft flying under visual flight rules without running the risk of changing the rules, customs and habits of pilots who fly under VFR.

To this end, account needs to be taken of the specific aeronautical constraints on light VFR aviation. Gliders in particular are subjected to the most stringent constraints because:

- available energy is limited to the use of one additional 12 V/6 A.h battery;
- the space available is in the order of a few cubic decimeters;
- the maximum mass per square centimeter and the total mass are restricted due to the need to comply with certification constraints;
- the addition of external antennas to the fuselage would be detrimental, as would any change in the aerodynamics of the craft. A system that would satisfy these constraints will generally be suitable to all the other categories of aircraft flying under VFR, in particular light aircraft, helicopters, ULM . . .

A number of anti-collision devices currently exist, co-operative or autonomous, which are used in aeronautical applications.

Two categories of known autonomous devices may be cited:

1) Passive devices, which are generally optical and of the infrared sensor type, offer high performance in military applications where the targets have adapted infrared signatures.
2) Active devices, of the airborne radar type, require transmission and reception of a radar wave. The bandwidth of the signal determines the distance resolution performance. Other criteria, such as wavelength, determine the size of transmission and reception antennas.

Five categories may be cited among the co-operative devices:

1) Some devices seek to increase the aircraft visibility (anti-collision lights, colored stripes painted or adhered to gliders, . . . ). These devices generally depend on the type of aircraft on which they are used. They do not significantly increase the pilot's ability to look in the right place in good time.
2) Other devices are designed to optically detect the flashing anti-collision lights of aircraft. However, these lights are not provided on all VFR aircraft. Secondly, the range of these devices is limited (approximately 1 km), which seems inadequate given the typical speeds at which light aircraft travel and the average reaction times.
3) Systems of the "TCAS" type (Traffic alert and Collision Avoidance Systems) require a substantial source of energy and the installation of two sets of transmitting and receiving antenna respectively on the upper and lower parts of the aircraft. They operate as a real on-board secondary radar. They are only able to detect aircraft fitted with operating transponders, which is not usually the case with VFR aircraft. Some of these systems use trajectographic algorithms to suggest avoidance maneuvers to the pilots. TCAS II, in particular, became compulsory in the USA in 1993 for all craft having more than thirty seats.
4) Variants of TCAS require the support of secondary air control radar to listen to the transponders of neighboring aircraft when interrogated. This secondary radar support is not available all over the world and makes the system dependent on ground installations.
5) Radio-electric devices of the beacon type may incorporate a position-detecting means, a data transmitter and receiver, a unit for computing potential conflicts and a display device for the pilot. An example of such a device is described in U.S. Pat. No. 4,835,537. Like the TCAS, these devices do not seem particularly well suited to VFR flight conditions since they require the use of display screens on which relatively complex information is presented, some of which relates to aircraft presenting virtually no risk of collision. The pilot's attention is somewhat distracted by the instrument, which goes against the very principle of the visual flight rules.

Therefore, no collision prevention device is available today which is particularly adapted to cover specific aspects inherent in the safety of all aircraft types flying under VFR rules. In particular, there is no device capable of taking account of complex trajectories such as those of gliders moving in ascending spirals, which cause a considerable number of accidents.

The purpose of the invention is to propose anti-collision devices of the co-operative type which are especially well suited to VFR conditions.

SUMMARY OF THE INVENTION

Accordingly, the invention proposes a device to assist piloting under visual flight rules, to be installed on board an aircraft and comprising:

- measuring means for estimating at least the instantaneous position and velocity vector of the aircraft;
- a radio transceiver for broadcasting co-operation messages containing parameters representing at least the estimated instantaneous position and velocity vector of the aircraft and for receiving similar co-operation messages broadcast by other aircraft;
- means for analyzing the co-operation messages received by the radio transceiver and data output by the measuring means, to identify potential risks of collision with other aircraft; and
- a man-machine interface to alert the aircraft pilot to potential risks of collision identified by the analysis means.

According to the invention, the analysis means are arranged to perform the following operations at successive instants of analysis:

- sub-dividing an analysis period, commencing at the current instant of analysis, into a series of consecutive time intervals;
- for each of said time intervals, determining a protected volume on the basis of different possible future positions of the aircraft derived from the data output by the measuring means;

extrapolating the trajectory of each other aircraft from which a co-operation message is received, on the basis of the parameters contained in said co-operation message, so as to estimate possible positions of said other aircraft in the time intervals of the series; and if a condition is satisfied whereby an estimated possible position of another aircraft in one of said time intervals in the series is located within the protected volume determined for said time intervals, controlling the man-machine interface to issue the pilot with a signaling message indicating the direction in which said other aircraft is located at the current instant of analysis.

Being co-operative in nature, the device is common to all aircraft which fly under VFR rules, including gliders in particular, and is operated a priori all over the world without the constraints inherent in any other control mechanisms or dependent on ground-based installations.

The device can operate to an accuracy that will enable compliance with the average reaction time of a VFR pilot. According to some studies, this time has been estimated at 12.5 seconds between the instant at which the pilot sees the other aircraft and the instant at which he avoids it, including sighting the object (0.1 s), recognizing it (1 s), realization of the certainty of collision (5 s), the decision to turn (4 s), the muscular reaction (0.4 s) and the average response time of a light aircraft or glider (2 s).

The nature and operation of the device do not require to change the rules, customs and habits of pilots flying under VFR, or impose additional workload on them.

Preferably, the signaling message also indicates the time remaining until the first of the time intervals in the analysis period for which said condition is fulfilled. This will enable the pilot to assess how urgently he needs to act.

In order to facilitate visual location of the other aircraft, the signaling messages advantageously include an indication of an apparent size of the other aircraft, determined on the basis of real size indications included in the co-operation messages and of the distance between the two aircraft.

Preferably, the man-machine interface comprises means for issuing signaling messages in the form of voice messages. This being the case, the device does not divert the visual attention of the pilot towards the interior of the cockpit, unlike most anti-collision systems designed for light aircraft, which use a display screen to provide the pilot with a graphical presentation of the traffic and/or potentially conflicting aircraft nearby. The structure of the signaling voice message may be in accordance with a specific phraseology, comparable with conventional radio telephone messages, e.g.: "Traffic, 15 seconds, 11 o'clock, 10°, size 2". Thus, a pilot used to receiving such information messages will be able to locate the aircraft posing a potential danger very rapidly. He will then be able to take the right decisions to avoid collision in view of the situation.

It will be left to the pilot to assess and choose the best avoidance maneuver, on the basis of the information supplied by the device and in compliance with the VFR rules which he must apply. Accordingly, the principle of the visual flight rules based on observing the surrounding space for 90% of the time will be satisfied.

The nature of the device and the algorithm used to process the available data enable a good adaptation to the different categories of aircraft in question, taking account of their speed, the way they move, their mean distribution density, the available space and the available on-board energy sources.

In a preferred embodiment of the device, the measuring means are arranged to estimate the instantaneous turning radius of the aircraft in a horizontal plane, on which the possible future positions of the aircraft depend, which the analysis means use as a basis for determining the protected volumes. By thus adapting the relevant protected volumes to the instantaneous turning radius of the aircraft, the effective risks of collision are better taken account of.

The duration of the analysis period is advantageously selected as an increasing function of the instantaneous turning radius if the latter is estimated by the measuring means, for example as the minimum between a reference period (or maximum warning time) and a time proportional to the ratio between the instantaneous turning radius estimated by the measuring means and the modulus of the projection on the horizontal plane of the instantaneous velocity vector estimated by the measuring means.

This limits the amount of information presented to the pilot, who is negotiating the turn, so as not to distract his attention, by avoiding issuing alerts to aircraft which are too far away to pose a real risk of collision given the instantaneous velocity and turning radius. This advantage is particularly useful in the case of gliders which have a small turning radius when in an ascending spiral and are often surrounded by other gliders which should be signalled in due course.

The device is preferably adjustable by the pilot regarding the maximum collision risk warning time. This will give him additional comfort corresponding to the reaction time which he prefers to allow himself depending on his personal capabilities, the average quantity of information which he would like to be delivered and the current flight phase (take-off, cruise, approach . . . ).

The nature of the device enables a relatively simple implementation and inexpensive manufacture. It may therefore be fitted systematically by small aircraft owners, unlike some of the other, relatively expensive devices. Widespread use of this device can thus be achieved, a condition crucial to enhancing flight safety.

DESCRIPTION OF THE DRAWINGS

FIGS. 5 to 7 are schematic views in elevation, from above and in perspective of a protected volume defined for a given period of time.

DESCRIPTION OF PREFERRED EMBODIMENT

Figure 1:
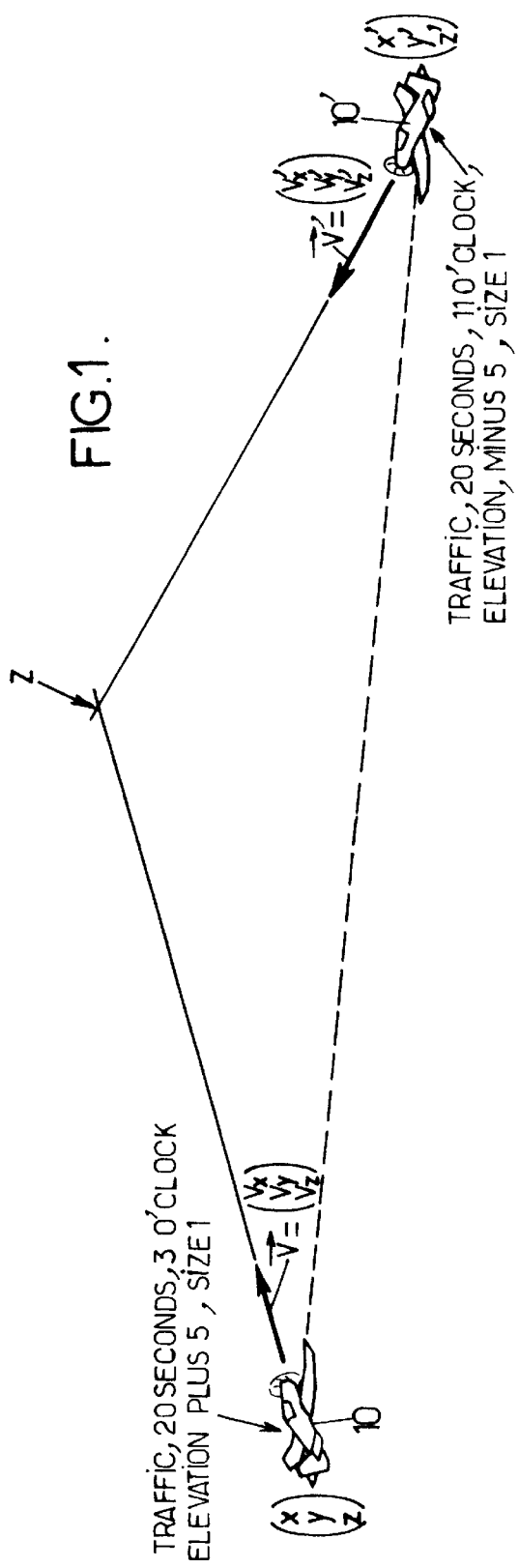
FIG. 1 illustrates examples of signaling messages issued by a device according to the invention to pilots flying aircraft under VFR rules.

FIG. 1 illustrates the conditions under which the present invention is applied, depicting two aircraft 10, 10' flying in proximity to one another in visual flight. Each of the aircraft is fitted with a device according to the invention, described in more detail below, which enables its pilot to be issued with information, in the form of voice messages, which will make it easier to visually locate the other aircraft should a risk of collision with it arise within a certain zone Z.

A signaling voice message of this type is issued in a format similar to that which might be given by a co-pilot, making it easier for the pilot to interpret. In the illustration given in FIG. 1, this information is made up of five elements:

the first ("Traffic") indicates to the pilot the nature of the message, to draw his attention to the fact that he should be in sight of another aircraft;

the second ("20 seconds") provides an estimation of the time remaining to the instant of a potential collision within the zone Z;

the third and fourth elements ("3 o'clock, elevation plus 5" for the aircraft 10, "11 o'clock, elevation minus 5" for the aircraft 10') indicate, within a co-ordinate system linked to the aircraft, the general direction in which the pilot should look in order to locate the other aircraft, i.e. the direction corresponding to the broken line in FIG. 1. This direction is indicated with the aid of an azimuth angle φ expressed, in a usual manner, in the form of the time indicated by the small needle of a clock dial, and an elevation angle expressed in degrees relative to the horizon line;

the fifth element ("size 1") is an indication of the apparent size of the other aircraft, to make it easier to locate.

In order to work out such signaling messages, each aircraft 10 is fitted with a device comprising:

measuring means for estimating instantaneous parameters x, y, z, $V_x$, $V_y$, $V_z$, R of the trajectory of the aircraft 10 fitted with the device, in a co-ordinate system common to all the aircraft;

a radio transceiver for broadcasting co-operation messages incorporating some of the estimated instantaneous parameters for the aircraft 10, and for receiving similar co-operation messages broadcast by other aircraft 10' located within range of the aircraft 10;

means for analyzing collisions risks on the basis of the trajectory parameters estimated for the aircraft 10 and trajectory parameters obtained from the co-operation messages received by the radio transceiver;

a man-machine interface for issuing the signaling messages based on the result of the collision risk analysis.

Figure 2:
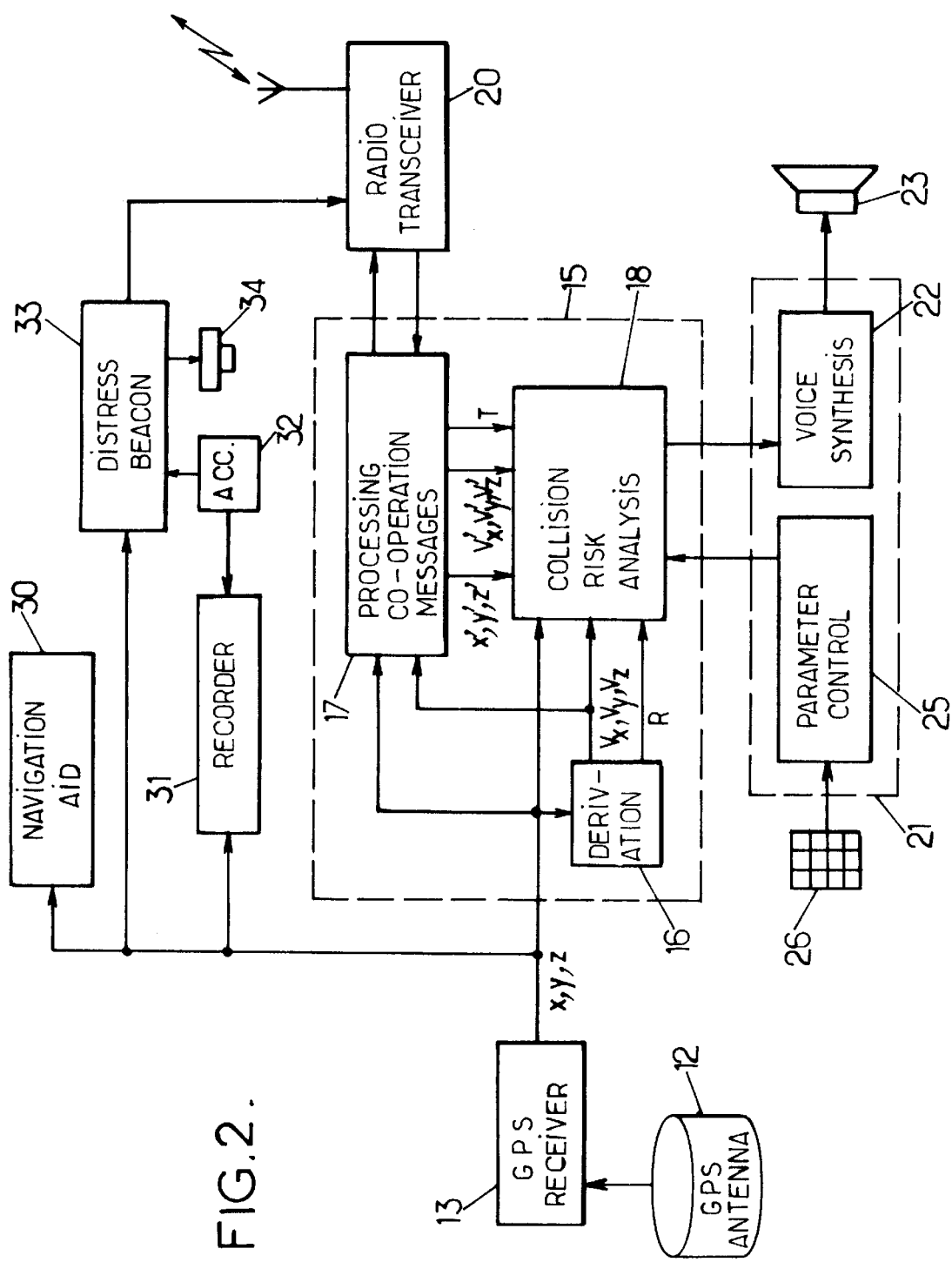
FIG. 2 is an overall diagram of a device as proposed by the invention.

In the device illustrated in FIG. 2, the measuring means pick up positioning reference signals output by a satellite constellation, such as GPS signals (Global Positioning System). They incorporate a GPS antenna 12 and an associated receiver 13 which processes the GPS signals to derive therefrom the instantaneous position of the aircraft 10 in the form of its three co-ordinates x, y, z within a co-ordinate system independent of the aircraft. By way of example, the x co-ordinate may correspond to longitude, the y co-ordinate to latitude and the z co-ordinate to altitude, the plane xOy being a horizontal plane. For certain parameters, the GPS measurements might be completed by measurements taken by on-board sensors of the aircraft (for example an altimeter in the case of the parameter z).

In the architecture illustrated in FIG. 2, the device consists of a computer 15, such as a microprocessor having a working memory and a program memory. In the block diagram of FIG. 2, the computer 15 has three modules 16,17,18 which, in practice, may be software modules, i.e. program elements run by the microprocessor.

The module 16 derives the position parameters x,y,z output by the GPS receiver 13 in order to estimate the co-ordinates $V_x$,$V_y$,$V_z$ of the velocity vector $\vec{V}$ of the aircraft 10 within the same co-ordinate system, as well as the instantaneous turning radius R of the aircraft 10 in the horizontal plane xOy. Two successive GPS measurements enable the speed vector $\vec{V}$ to be estimated and three successive measurements enable the turning radius R to be estimated.

The module 17, firstly, formats the co-operation message broadcast by the radio transceiver 20 and, secondly decodes the co-operation messages received from other aircraft 10'. Each co-operation message corresponds to a data block, the size of which may be, e.g., 90 bits. An example of how the bits are distributed in such a block is given in Table I.

TABLE I

| Data type | Number of bits | Sign bits | Accuracy | range |
| --- | --- | --- | --- | --- |
| Longitude x | 23 | 1 | $10^{-4°}$ | ±180° |
| Latitude y | 22 | 1 | $10^{-4°}$ | ±90° |
| Altitude z | 13 | 0 | 4 m | 32767 m |
| x velocity | 8 | 1 | 1 m/s | +255 m/s |
| y velocity | 8 | 1 | 1 m/s | ±255 m/s |
| z velocity | 6 | 1 | 0.5 m/s | +31 m/s |
| Aircraft size T | 2 | 0 | 1 | 4 |
| Checksum | 3 | | | |
| Total | 90 | | | |

In table I, the first six rows correspond to the instantaneous position and velocity x,y,z, $V_x$,$V_y$,$V_z$ of the aircraft. The size T of the aircraft is an indication which may assume four values and represents the real size of the aircraft (for example, proportional to its span). The checksum (CRC) is made up of three redundancy bits enabling the processing module 17 to detect any transmission errors in a received co-operation message.

In view of the difficulty in obtaining a frequency bandwidth for a communication channel, the protocol applied by the radio transceiver 20 preferably uses a common frequency channel to be shared by all the participants.

The protocol used to communicate is of the time-division multiple access type (TDMA) where each aircraft transmits on a common carrier frequency. The channel can be optimized by an appropriate protocol of the ALOHA type, whereby the different participants transmit in turn during given periods, synchronized by GPS timing. A protocol of this type is described in French patent 2,708,124 and its U.S. counterpart U.S. Pat. No. 5,544,075, incorporated herein by reference.

The frequency channel is divided into reproducible periods $T_c$, each period comprising a number $N_c$ of equally distributed time slots. In order to transmit, a time slot is accessed by identifying free time slots during a listening period of at least $T_c$ seconds and then randomly choosing one of the slots identified as being free. This method includes a channel access procedure (listening and then choosing a free slot), a phase of occupying the chosen slot and a procedure of releasing the slot.

A practical way of optimizing transmission time is to adapt the time periods $T_c$, the number of slots $N_c$ and the data format to the present application. The protocol may be adapted to the data to be transmitted as follows: a period $T_c$=1 second is chosen in order to allow the locating data derived from the GPS signals to be sufficiently refreshed; the number of time slots is $N_c$=100 which, for the time $T_c$=1 second, leaves a period of 0.01 second for transmission of the payload data. Accordingly, this number $N_c$ is judiciously chosen so as to be higher than the number of VFR aircraft likely to be encountered in the zone covered by the radio transceiver 20 in extreme cases, for example during glider competitions.

Preferably, for a transmission rate of 9600 baud (value typical of commercially available modems which, in VHF, comply with the authorized bandwidth of ±12.5 kHz), the maximum size of a data block will therefore be 96 bits per aircraft.

With this transmission rate of 9600 baud, if occupancy of the channel is optimized by allocating a 0.01 second time slot to each aircraft, the 90 bit block of table I can be transmitted in 9.375 ms, which leaves a free time of 625 μs between consecutive messages to enable the transceivers 20 to switch from transmission to reception and to be able to insert listening ranges within the occupied ranges in accordance with the method described in French patent 2,708, 124.

The radio transceiver 20 picks up the co-operation messages broadcast by the aircraft 10' located within radio range of the aircraft 10 (typically a few kilometers) and extracts the positioning information x',y',z' of these aircraft 10', their velocity information $V'_x, V'_y, V'_z$ and their real size details T.

This information, along with that from the GPS receiver 13 and the deduction module 16, are processed by the analysis module 18 to evaluate the collision risks. This analysis may be in accordance with the procedure shown in FIG. 3, which is run at successive instants of analysis $t_p$ separated by a period $T_c$ ($t_{p+1}=T_p+T_c$) if the number NA of co-operation messages received from other aircraft 10' over the last period $T_c$ is greater than 0.

Figure 4:
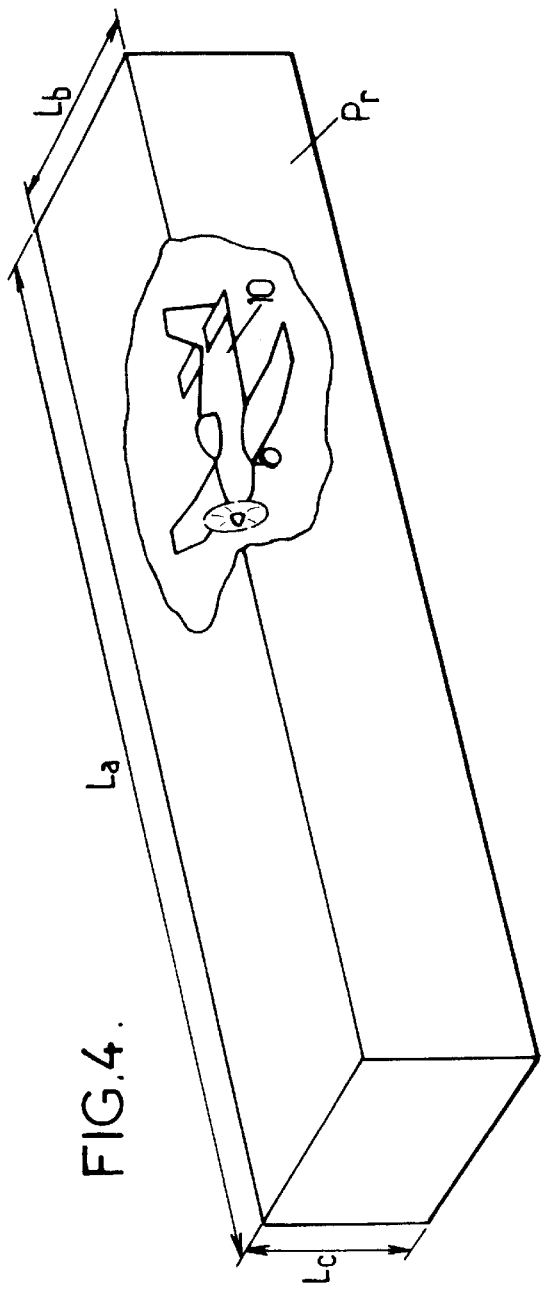
FIG. 4 is a perspective view of an elementary protected volume defined around the aircraft.

For each aircraft 10, an elementary protected volume is defined, which is fixed relative to the aircraft. The dimensions of this volume must be compatible with the GPS locating accuracy, i.e. a few tens of meters. As illustrated in FIG. 4, this elementary protected volume Pr may be in the shape of a rectangular parallelepiped, of a length $L_a$ in the longitudinal direction of the aircraft 10, a width $L_b$ along the span of the aircraft 10 and a height $L_c$. By way of example, if $L_a$=200 m (with protection as a priority in the direction of displacement), $L_b$=100 m (chosen in relation to the relative accuracy of the GPS) and $L_c$=50 m (the approach speed is lower in the vertical direction a priori).

Starting at each instant of analysis $t_p$, the module 18 defines an analysis period of a duration D. Advantageously, this duration D is a function of the instantaneous turning radius R and the velocity $V_h$ of the aircraft 10 in the horizontal plane xOy, i.e. $V_h=\sqrt{V_x^2+V_y^2}$.

Figure 3:
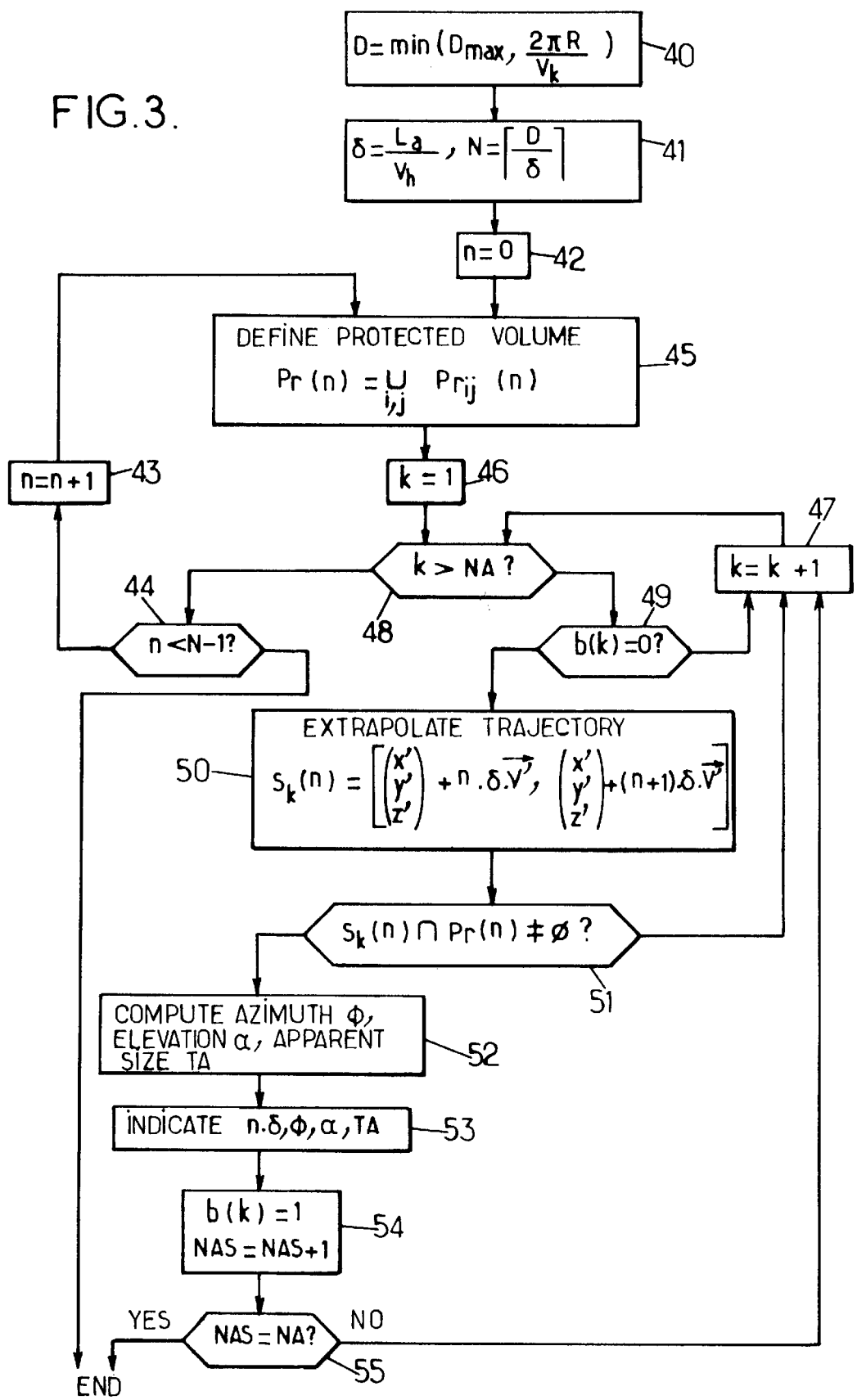
FIG. 3 is a flow chart setting out the operations performed by an analysis module of the device illustrated in FIG. 2.

In the example illustrated in FIG. 3 (step 40), the duration D of the analysis period is an increasing function of the instantaneous turning radius R supplied by the deduction module 16, namely the minimum between a reference period $D_{max}$ (or maximum warning time) and a period equal to $$\frac{2\pi R}{V_h}.$$

This latter period $$\frac{2\pi R}{V_h}$$

is equal to the time needed for the aircraft 10 to make a complete revolution, as seen in the horizontal plane, if it maintains its instantaneous velocity and turning radius. The fact of limiting the period D to this time (or to a time proportional to it) allows the quantity of information that will be issued to the pilot about the typical instantaneous trajectories of all the VFR aircraft (including gliders in ascending spiral) to be limited.

At step 41 of the analysis procedure, the module 18 sub-divides the analysis period [$t_p$, $t_p$+D] into a series of N consecutive time intervals. Each of these time intervals has a duration $$\delta = \frac{L_a}{V_h},$$

the number N being an integer equal to or immediately higher than the ratio $$\frac{D}{\delta}.$$

Then, for each of the time intervals from n=0 to n=N−1, the module 18 determines a protected volume Pr(n) on the basis of different possible future positions of the aircraft 10 deduced from the trajectory parameters x,y,z,$V_x,V_y,V_z$,R, and examines whether other aircraft are likely to enter this volume within the time interval considered. In the example illustrated in FIG. 3, these operations are performed in a loop indexed by the integer n (initialized at n=0 at step 42 and incremented by one unit at step 43 after these operations have been run if n<N−1 at test 44).

The protected volume Pr(n) is defined in step 45 based on the elementary volume Pr of FIG. 4. This protected volume Pr(n) is, for example, built using the following procedure illustrated in FIGS. 5 to 7.

Viewed as projected in a horizontal plane (FIG. 6), the possible future positions $M_{i,j}(n)$ of the aircraft 10 taken into account to determine the protected volume Pr(n) are contained, on the one hand, between the straight half-curve Δ defined by the position x,y,z and the velocity vector $\vec{V}$ determined on the basis of the last GPS measurements and, on the other hand, the convex side of the arc A defined by the position x,y,z, the velocity vector $\vec{V}$ and the instantaneous turning radius R supplied by the module 16. Projecting into this horizontal plane, a number 1+I(n) possible positions $M_{i,0}(n)$ are taken into account for the time interval n, associated respectively with velocity vectors $\vec{V}_{i,0}(n)$. The number I(n) depends on the relative values of n.δ, R, $V_h$, $L_a$ and $L_b$. The position $M_{i,0}(n)$ and velocity vector $\vec{V}_{i,0}(n)$ are computed for 0≤i≤I(n), as being those which the aircraft 10 would have at the instant $t_p$+n.δ if it were to maintain its horizontal speed $V_h=\|\vec{V}_{i,0}(n)\|$ on a trajectory with a constant radius of curvature equal to $$\frac{R \cdot I(n)}{i}.$$

Viewed in projection in a vertical plane, the possible positions $M_{i,j}(n)$ of the aircraft for the period of time n are between the straight half-curve Δ' defined by the position x,y,z and the instantaneous velocity vector $\vec{V}$ derived from the GPS measurements on the one hand and the straight half-curve Δ" defined by the position x,y,z and by the horizontal direction on the other (FIG. 5). Each of the J(n) points $M_{i,j}(n)$ for 1≤j≤J(n) (the number J(n) depends on the relative values of n.δ, $V_z$, $L_a$ and $L_c$) is derived from the point $M_{i,0}(n)$ by assuming that the vertical component of the associated velocity vector $\vec{V}_{i,j}(n)$ is constant from $t_p$ to $t_p$+n.δ and equal to $$\frac{V_z'j}{J(n)},$$

the horizontal component of $\vec{V}_{i,j}(n)$ being $\vec{V}_{i,0}(n)$.

By locating the elementary protected volume Pr in relation to the possible future position $M_{i,j}(n)$ and by orienting this elementary volume in accordance with the associated velocity vector $\vec{V}_{i,j}(n)$, an elementary volume is obtained, noted $Pr_{i,j}(n)$. The protected volume Pr(n) determined at step 45 for the time interval n corresponds to the merger of these elementary volumes $Pr_{i,j}(n)$ for $0 \leq i \leq I(n)$ and $0 \leq j \leq J(n)$. This volume Pr(n) is approximately of the shape illustrated in FIG. 7.

Having thus defined the protected volume Pr(n) at step 45, the analysis module 18 examines whether one of the aircraft 10' from which a co-operation message has been received is likely to enter this protected volume Pr(n) during the time interval n. In the example illustrated here, this is performed in a loop, the iterations of which are controlled by an index k denoting the co-operation messages received or, in an equivalent manner, the aircraft which have broadcast these messages (initialized by k=1 at step 46 and incremented by one unit at step 47 at the end of the iteration). A bit b(k) is associated with each co-operation message received, corresponding to an aircraft k, indicating whether this aircraft has already been considered as posing a collision risk in the analysis performed from instant $t_p$. Before proceeding with this analysis, all the bits b(k) are initialized to 0. The number NAS, initialized to 0, denotes the number of aircraft which have been considered as posing a risk of collision.

If the index k is lower than or equal to the number NA of aircraft detected (test 48), and if the aircraft k has not already been identified as posing a collision risk (b(k)=0 in the test 49), the analysis module 18 extrapolates the trajectory of the aircraft k over the time interval n at step 50. To this end, it determines the segment $S_k(n)$ which the aircraft k will describe in the time interval n if it maintains its velocity vector $\vec{V}$, the co-ordinates of which are provided by the processing module 17, as well as its instantaneous position x',y',z' also provided by the processing module 17.

The ends of this segment $S_k(n)$ are the two points of co-ordinates $$\begin{pmatrix} x' \\ y' \\ z' \end{pmatrix} + n \cdot \delta \cdot \vec{V}' \quad \text{and} \quad \begin{pmatrix} x' \\ y' \\ z' \end{pmatrix} + (n+1) \cdot \delta \cdot \vec{V}'$$

in the Cartesian system common to the aircraft.

At step 51, the risk of collision during the interval n is estimated by examining whether at least a part of the segment $S_k(n)$ is located inside the protected volume Pr(n). The fact of having defined the protected volume Pr(n) as a combination of parallelepipedic elementary protected volumes at step 45 considerably facilitates the check made at step 51, given that it is very easy to determine whether the intersection between a segment and a rectangular parallelepiped is empty or not.

If step 51 reveals a risk of collision (intersection not empty), the module 18 computes, at step 52, the azimuth angle φ and the elevation angle α corresponding to the direction in which the aircraft k potentially in conflict is visible from the aircraft 10 at the instant $t_p$. These angles φ,α are simply determined by a change of co-ordinate system from the coordinates x,y,z and x',y',z' of the two aircraft.

At step 52, the module 18 also evaluates the apparent size TA of the other aircraft k from the ratio $$\frac{T}{Dist}$$

between the real size T of the aircraft k, obtained by the module 17 in the corresponding co-operation message and the distance $Dist = \sqrt{(x'-x)^2 + (y'-y)^2 + (z'-z)^2}$ between the two aircraft.

At step 53, the analysis module 18 informs the man-machine interface 21 of the device that a signaling message must be issued, indicating: (i) that a time n.δ remains before a potential collision; (ii) the azimuth and elevation angles φ,α computed at step 52, and (ii) the apparent size TA computed at step 52. The module 18 changes the value of the bit b(k) and increases the number NAS by one unit at step 54. If the number NAS is equal to the number of aircraft NA, then all the aircraft for which a co-operation message was received have already been the object of a signaling message, so that the analysis from instant $t_p$ is terminated.

The iteration k of the loop terminates with the incrementation at step 47 if b(k)=1 at step 49 (aircraft already signaled), if $S_k(n) \cap Pr(n) = \emptyset$ at step 51 (collision unlikely) or if NAS<NA at step 55. When all the aircraft have been reviewed for the time interval n (k>NA at step 48), the analysis module 18 moves on to step 44 to study the next time interval n, or to terminate the analysis from instant $t_p$.

The man-machine interface (FIG. 2) comprises a voice synthesis module 22 receiving the information supplied by the analysis module 18 at step 53. This module 22, which is of a known design, works out the voice signaling messages and controls a loudspeaker or an earpiece 23 so that these voice messages are issued to the pilot.

The man-machine interface 21 also has a module 25 for regulating parameters enabling the pilot, using a unit such as a keyboard 26, to select the value of certain parameters of the trajectographic algorithm and/or the collision risk assessment algorithm run by the computer 15.

In particular, it is practical to be able to select the maximum warning time $D_{max}$ (used at step 40). The assisting device can thus issue the pilot with more or less information by exploring a more or less extensive zone in front of the aircraft, depending on the experience of the pilot or the mean reaction time which he estimates he has or on the current flight phase (take-off, cruise, approach . . . ).

It should be pointed out that the collision risk analysis procedure explained above with reference to FIGS. 3 to 7 is only one example of such a procedure which might be implemented using a device according to the invention. Various alternatives are possible at different steps of the procedure.

For example, the extrapolation of the trajectory of other aircraft at step 50 might consist, rather than determining a segment computed by extending the velocity vector of the other aircraft, in computing a volume taking account of a potential variation in the velocity vector of the other aircraft within a certain range. However, this would increase the required amount of computation.

It would be conceivable to use other types of collision risk analysis in different aircraft, with a relatively simple analysis for inexpensive versions of the device and more sophisticated analysis in other versions. It would also be conceivable for different types of analysis to be provided in a same device, which could then be selected by the pilot with the aid of the unit 25 of the man-machine interface 21.

It is essentially at the level of broadcasting co-operation messages that a certain uniformity must exist between the different VFR aircraft so that these co-operation messages are fully understood by each of them.

The fact that the device incorporates a GPS receiver 13 and a radio transceiver 20 advantageously permits that it fulfils other functions.

For example, if the aircraft 10 is fitted with a navigation aid system 30, the positioning data x,y,z issued by the GPS receiver 13 and optionally the velocity or curvature data $V_x, V_y, V_z, R$ produced by the derivation module 16 may be applied to this system 30 so that it can process them.

The positioning data x,y,z regularly issued by the GPS receiver 13 may also be applied to a recorder 31 containing a certain number of memory locations managed on a first in-first out (FIFO) basis in order to store a certain number of estimated positions of the aircraft up to the current instant with the aid of GPS measurements. The recorder 31 co-operates with an impact sensor 32 such as an accelerometer. In the event of impact, the data stored in the recorder 31 is locked. The recorder 31 therefore assumes the role of a black box enabling the course of the aircraft prior to impact to be tracked.

The positioning data x,y,z may also be applied to a unit 33 controlling a distress beacon. This unit 33 controls the radio transceiver 20 in response to an impact detected by the accelerometer 32 or in response to a manual control 34 activated by the pilot so that a distress message incorporating the latest data x,y,z can be issued, for example on the frequency 121.5 MHz. The fact that this distress message incorporates the last position of the aircraft evaluated by the GPS receiver 13 greatly facilitates the task of locating the aircraft in the event of difficulty, relative to the conventional distress beacons which are usually fixed by goniometry.

What is claimed is:

1. Device to assist piloting under visual flight rules, to be installed on board an aircraft and comprising:

measuring means for estimating at least an instantaneous position and a velocity vector of the aircraft;

a radio transceiver for broadcasting co-operation messages containing parameters representing at least the estimated instantaneous position and velocity vector of the aircraft and for receiving similar co-operation messages broadcast from other aircraft;

means for analyzing the co-operation messages received by the radio transceiver and data output by the measuring means, to identify potential risks of collision with other aircraft; and a man-machine interface to alert the aircraft pilot to potential risks of collision identified by the analysis means, the analysis means are arranged to perform the following operations at successive instants of analysis:

sub-dividing an analysis period, commencing at the current instant of analysis, into a series of consecutive time intervals;

for each of said time intervals, determining a protected volume on the basis of different possible future positions of the aircraft derived from the data output by the measuring means;

extrapolating the trajectory of each other aircraft from which a co-operation message is received, on the basis of the parameters contained in said co-operation message, so as to estimate possible positions of said other aircraft in the time intervals of the series; and if a condition is satisfied whereby an estimated possible position of another aircraft in one of said time intervals in the series is located within the protected volume determined for said time intervals, controlling the man-machine interface to issue the pilot with a signaling message indicating the direction in which said other aircraft is located at the current instant of analysis.

2. Device according to claim 1, wherein the signaling message further indicates the time remaining until the first of the time intervals in the analysis period for which said condition is fulfilled.

3. Device according to claim 1, wherein each co-operation message broadcast by the transceiver includes an indication of a real size of the aircraft, and wherein each signaling message relating to another aircraft, from which a co-operation message is received, includes an indication of an apparent size of said other aircraft determined on the basis of the real size indication included in the received co-operation message and of the distance between the two aircraft derived from the position estimated by the measuring means and from the position of the other aircraft included in the received co-operation message.

4. Device according to claim 1, wherein the man-machine interface comprises means for issuing the signaling messages in the form of voice messages.

5. Device according to claim 3, wherein the signaling message further indicates the time remaining until the first of the time intervals in the analysis period for which said condition is fulfilled, wherein the man-machine interface comprises means for issuing the signaling messages in the form of voice messages, and wherein each signaling voice message relating to another aircraft comprises an indication of the nature of the message, said remaining time, the direction in which said other aircraft is located, expressed by an azimuth angle and an elevation angle, and the indication of apparent size.

6. Device according to claim 1, wherein the measuring means comprise a receiver for positioning reference signals transmitted from a constellation of satellites.

7. Device according to claim 1, wherein the radio transceiver is arranged to operate using a time-division multiple access protocol on a common carrier frequency, the co-operation message being transmitted in a time slot which is not occupied by a co-operation message from another aircraft.

8. Device according to claim 1, wherein the measuring means are arranged to estimate an instantaneous turning radius of the aircraft in a horizontal plane and wherein the future possible positions of the aircraft, which the analysis means uses as a basis for determining the protected volumes, depend on the instantaneous turning radius estimated by the measuring means.

9. Device according to claim 8, wherein the analysis period has a duration chosen as an increasing function of the instantaneous turning radius estimated by the measuring means.

10. Device according to claim 9, wherein the duration of the analysis period is chosen as the minimum between a reference duration and a duration proportional to a ratio between the instantaneous turning radius estimated by the measuring means and a modulus of a projection in the horizontal plane of the instantaneous velocity vector estimated by the measuring means.

11. Device according to claim 10, wherein the reference duration is adjustable via the man-machine interface.

12. Device according to claim 8, wherein, viewed in projection on a horizontal plane, the future possible positions of the aircraft, which the analysis means uses as a basis for determining the protected volumes, are contained between a straight half-curve defined by the instantaneous position and velocity vector estimated by the measuring means and a convex side of an arc defined by the position, instantaneous velocity vector and turning radius estimated by the measuring means.

13. Device according to claim 12, wherein, seen in a projection on a vertical plane, the possible future positions of the aircraft, which the analysis means uses as a basis for determining the protected volumes, are contained between a straight half-curve defined by the instantaneous position and velocity vector estimated by the measuring means and a straight half-curve defined by the instantaneous position estimated by the measuring means and by the horizontal direction.

14. Device according to claim 1, wherein the analysis period has a duration at most equal to a reference duration which is adjustable via the man-machine interface.

15. Device according to claim 1, wherein the radio transceiver is arranged to broadcast a distress signal, incorporating the position of the aircraft estimated by the measuring means, in response to a manual command from a pilot or automatic detection of a collision.

16. Device according to claim 1, wherein at least some of the data output by the measuring means are further provided to a navigation aid system.

17. Device according to claim 1, further comprising means for recording a number of positions of the aircraft estimated by the measuring means up to a current instant, the recording being locked in response to automatic detection of a collision.

* * * * *